United States Patent [19]

Savidan

[11] Patent Number: 5,146,751

[45] Date of Patent: Sep. 15, 1992

[54] DUAL MASTER CYLINDER WITH COMPENSATION

[75] Inventor: Henri Savidan, Luzarches, France

[73] Assignee: General Motors France, Gennevilliers, France

[21] Appl. No.: 693,180

[22] Filed: Aug. 24, 1990

[30] Foreign Application Priority Data

Sep. 14, 1989 [GB] United Kingdom ............... 8920873

[51] Int. Cl.$^5$ .............................................. B60T 11/20
[52] U.S. Cl. ...................................... 60/562; 60/592; 92/63; 92/82
[58] Field of Search ............... 60/562, 592; 92/62, 92/63, 82

[56] References Cited

U.S. PATENT DOCUMENTS

| | | | |
|---|---|---|---|
| 2,174,615 | 10/1939 | Bowen et al. | 60/562 |
| 3,355,887 | 12/1967 | Balster | 60/562 |
| 3,646,759 | 3/1972 | Hughes et al. | 60/562 |

FOREIGN PATENT DOCUMENTS

| | | |
|---|---|---|
| 486615 | 6/1938 | United Kingdom . |
| 986175 | 1/1964 | United Kingdom . |
| 1215055 | 12/1970 | United Kingdom . |

Primary Examiner—Edward K. Look
Assistant Examiner—F. Daniel Lopez
Attorney, Agent, or Firm—Ernest E. Helms

[57] ABSTRACT

A dual master cylinder (10) for the braking system of a motor vehicle comprising a bore (18), a primary portion and a secondary portion (14), in which the secondary piston (44) of the secondary portion comprises an outer piston (65) slidable in the bore, and a central piston (78), the central piston including a main body (86) slidable in the bore and a secondary body (92) slidable in a piston bore (64) in the outer piston, the piston bore having a shoulder (72) engageable with a first abutment face (98) on the central piston to define a check valve (62), the piston bore providing a fluid passage (96,68) between the high pressure chamber (56) and the low pressure chamber (48) of the secondary portion, the check valve allowing hydraulic fluid to flow through the fluid passage during a rest mode or a release mode of the dual master cylinder, but preventing such flow during an apply mode. Prevents damage to elastomeric cup seal (52) when back-pressure is generated by ABS due to the absence of a dilation port in the secondary portion, which is no longer required due to the presence of the check valve.

10 Claims, 4 Drawing Sheets

DUAL MASTER CYLINDER WITH COMPENSATION

This invention relates to a dual master cylinder for the hydraulic braking system of a motor vehicle. Other dual master cylinders are shown in U.S. Ser. No. 391,930, and G-6623 Dual Master Cylinder and G-6636 Dual Master Cylinder with Compensation Valve filed even date herewith.

Dual master cylinders are well known, and comprise a primary portion and a secondary portion each comprising a low pressure chamber and a high pressure chamber. Each portion also comprises a piston, with the pistons being aligned. The primary piston and the secondary piston are slidably secured together such as to have a maximum relative separation. A primary spring is compressed between the primary piston and the secondary piston. A ring stop, engageable by the primary piston, retains the various components in the dual master cylinder. A secondary spring acts on the secondary piston to bias the pistons towards the ring stop. Each portion is supplied with hydraulic fluid to its low pressure chamber from a reservoir by way of a compensation port. Elastomeric cup seals mounted on the pistons allow passage of hydraulic fluid from the low pressure chambers to the high pressure chambers (but not flow in the reverse direction) to compensate for return movement of the piston and for brake pad or shoe wear. A dilation port connects each high pressure chamber to its respective reservoir to allow excess fluid (generated by thermal expansion, etc.) to flow back to its respective reservoir. The dilation ports are, necessarily, small to reduce the deadstroke of the dual master cylinder (that is, loss of stroke between brake pedal movement and pressure build up), and to reduce the risk of damaging the elastomeric cup seals as they pass over the dilation port opening during movement of the pistons. This arrangement is such that in usual circumstances, on brake pedal depression, the primary piston passes its associated dilation port to seal it from its associated high pressure chamber; the secondary piston then passes its associated dilation port; the fluid pressure in the high pressure chamber of the secondary portion then begins to increase; and then the fluid pressure in the high pressure chamber of the primary portion rises. The use of a dual master cylinder in a motor vehicle provides two independent hydraulic circuits (a primary circuit and a secondary circuit integral with the primary portion and the secondary portion respectively) for the braking system. This ensures that the brakes can still be applied even in the event that one of the circuits should fail, such as due to a leakage of hydraulic fluid.

Whilst this known arrangement works satisfactorily on motor vehicles having a standard braking system, problems can arise on motor vehicles fitted with ABS (anti-lock braking systems), and in particular to back-pressure ABS in which hydraulic fluid can be pumped back to the high pressure chambers during operation of ABS. This action can result in very high fluid pressures being generated within the high pressure chambers. If, when ABS comes into operation, an elastomeric cup seal is positioned over a dilation port opening, the high pressure in the high pressure chamber can force the cup seal into the dilation port and damage it. Any such damage can result in a failure in at least one of the circuits. In usual arrangements, the primary piston passes its corresponding dilation port before the secondary piston passes its corresponding dilation port on application of the vehicle brakes. During ABS operation, therefore, it is more likely that the elastomeric cup seal on the secondary piston would be damaged, rather than the cup seal on the primary piston. Suitable alternative arrangements have been proposed, but these have tended to involve extending the length of the master cylinder.

It is an object of the present invention to overcome the above mentioned problem.

To this end, a dual master cylinder in accordance with the present invention comprises a bore having an open end and a closed end; a primary portion including a primary piston slidable in the bore, a low pressure chamber within the bore and defined by the shape of the primary piston, and a compensation port opening into the low pressure chamber and connectable with a primary fluid reservoir; and a secondary portion including a secondary piston slidable in the bore, a low pressure chamber within the bore and defined by the shape of the secondary piston, and a compensation port opening into the low pressure chamber and connectable with a secondary fluid reservoir; the primary portion including a high pressure chamber within the bore between the primary piston and the secondary piston, and the secondary portion including a high pressure chamber within the bore between the secondary piston and the closed end of the bore; a seal being mounted on the primary piston between the low and high pressure chambers of the primary portion; a seal being mounted on the secondary piston between the low and high pressure chambers of the secondary portion; the high pressure chamber of the primary portion being fluidly connectable with the primary fluid reservoir by dilation means; the secondary piston comprising an outer piston slidable in the bore and having the secondary piston seal mounted thereon, and a central piston, the central piston including a main body slidable in the bore and a secondary body slidable in a piston bore in the outer piston, the piston bore having a shoulder engageable with a first abutment face on the central piston to define a check valve, the piston bore providing a fluid passage between the high pressure chamber and the low pressure chamber of the secondary portion, the check valve allowing hydraulic fluid to flow through the fluid passage during a rest mode or a release mode of the dual master cylinder, but preventing such flow during an apply mode.

In the present invention, the check valve performs the function of the previously known dilation port for the secondary portion, and also provides a means for compensating for any reduction of hydraulic fluid in the high pressure chamber in the secondary portion. By removing the previously known dilation port from the secondary portion, potential damage of the seal on the secondary piston is removed.

The seal on the secondary piston is preferably an elastomeric cup seal. In this case, both the elastomeric cup seal and the check valve can provide the compensating effect. The seal on the primary piston is preferably an elastomeric cup seal.

Preferably, the piston bore comprises a small diameter portion which opens into the high pressure chamber of the secondary portion and a large diameter portion, the shoulder being positioned between the large diameter portion and the small diameter portion; the large diameter portion opens into the low pressure chamber of the secondary portion; the central piston comprises an intermediate body between the main body and the secondary body and positioned within the large diameter portion of the piston bore; and the secondary body is slidably positioned in the small diameter portion of the piston bore, the first abutment face being positioned between the intermediate body and the secondary body, the secondary body having a channel in its surface; the fluid passage being defined by the channel, and the large diameter portion. In this case, where an elastomeric ring seal is positioned between the first abutment face and the shoulder, the elastomeric ring seal is preferably is mounted in a first circumferentially extending groove in the secondary body.

The axial length of the secondary body is preferably greater than the axial length of the small diameter portion of the piston bore by a predetermined amount to define the maximum separation of the first abutment face and the shoulder.

Preferably, where an elastomeric ring seal is positioned between the first abutment face and the shoulder, the central piston has a second abutment face engageable with one end of the outer piston to prevent overcompression of the elastomeric ring seal.

Abutment means preferably projects into the low pressure chamber of the secondary portion which is engageable by shoulder means on the outer piston to ensure opening of the fluid passge in the rest mode. In this case, the abutment means is preferably a leg pressed out from a disc and positioned to project through the compensation port of the secondary portion. Alternatively, the abutment means may be defined by a cylindrical pin which is positioned to project through the compensation port of the secondary portion.

Preferably, one end of the secondary spring is retained in a second circumferentially extending groove in the secondary body.

Preferably, where the seal on the primary piston is an elastomeric cup seal, the dilation means in the primary portion is a dilation port. Alternatively, the dilation means may be a check valve means.

The present invention will now be described, by way of example, with reference to the accompanying drawings, in which.

Figure 1:
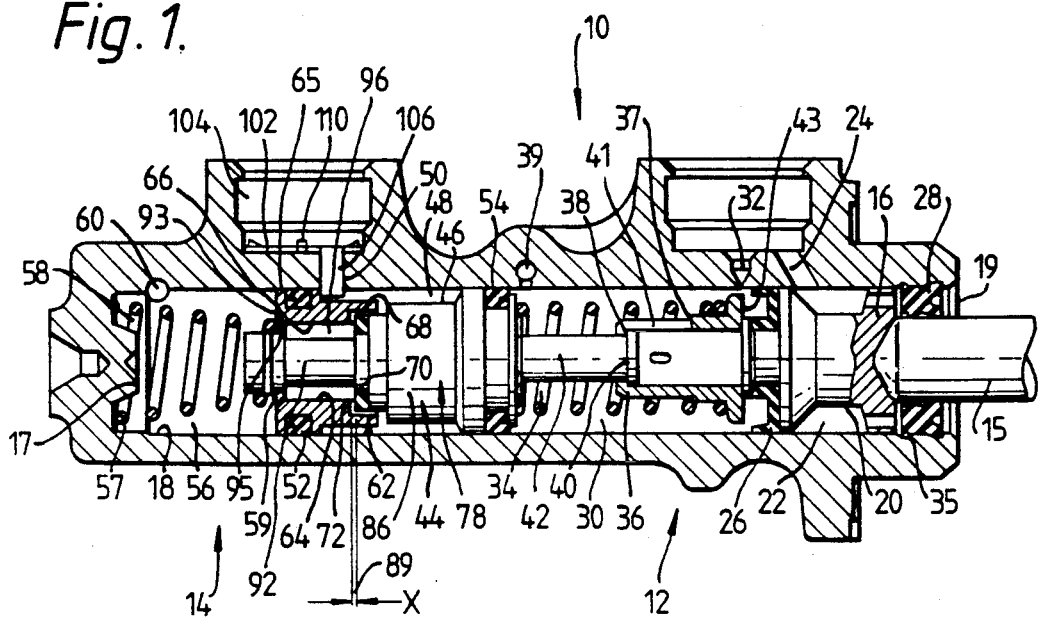
FIG. 1 is a cross-sectional view of a dual master cylinder in accordance with the present invention in the rest mode.
Figure 2:
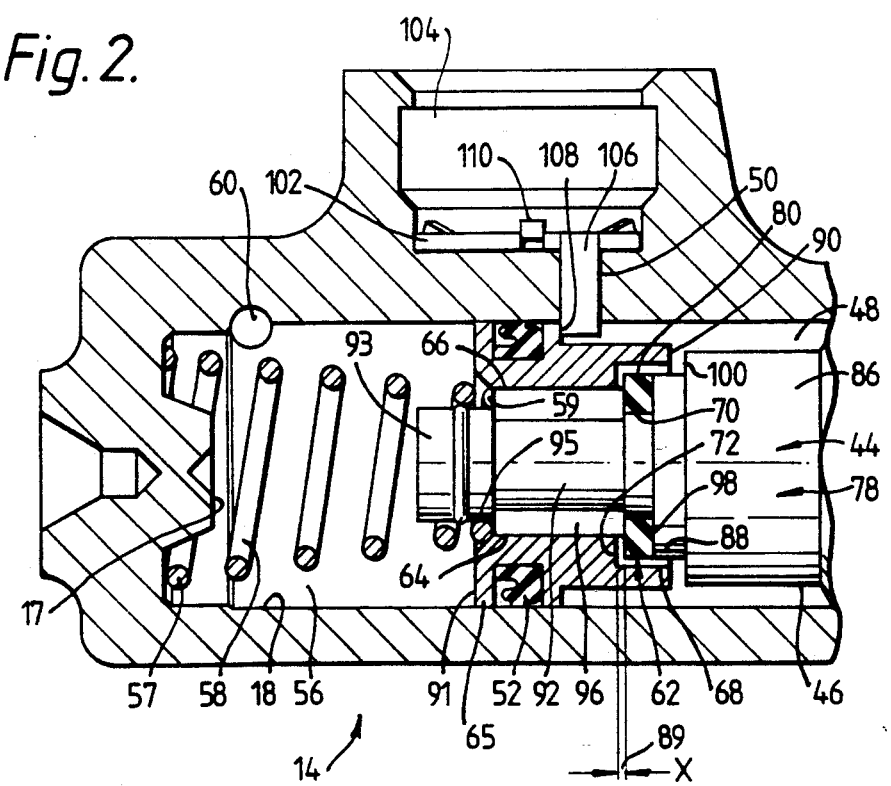
FIG. 2 is an enlarged cross-sectional view of part of the dual master cylinder shown in FIG. 1.
Figure 3:
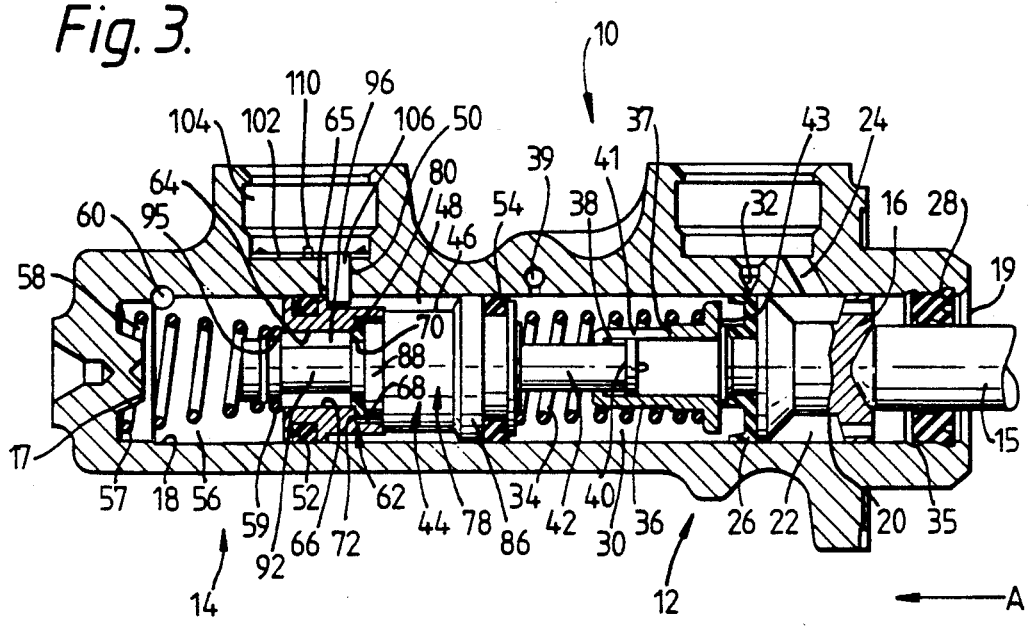
FIGS. 3 and 4 are similar views to that of FIGS. 1 and 2, respectively with the dual master cylinder in the apply mode.
Figure 4:
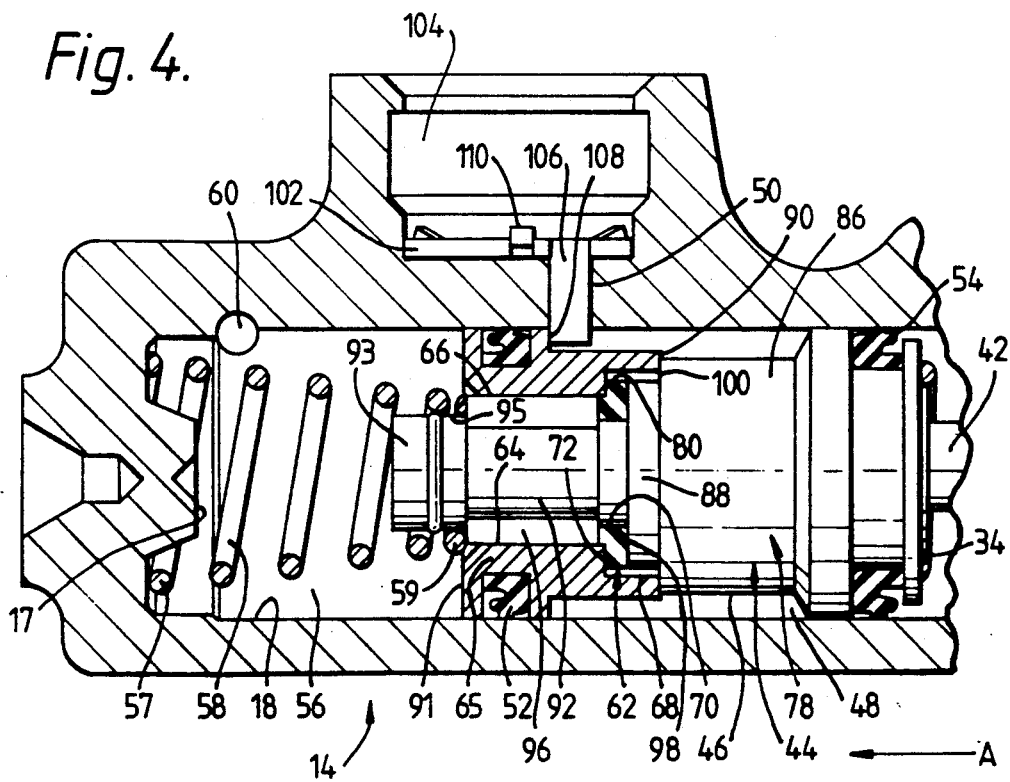
Figure 5:
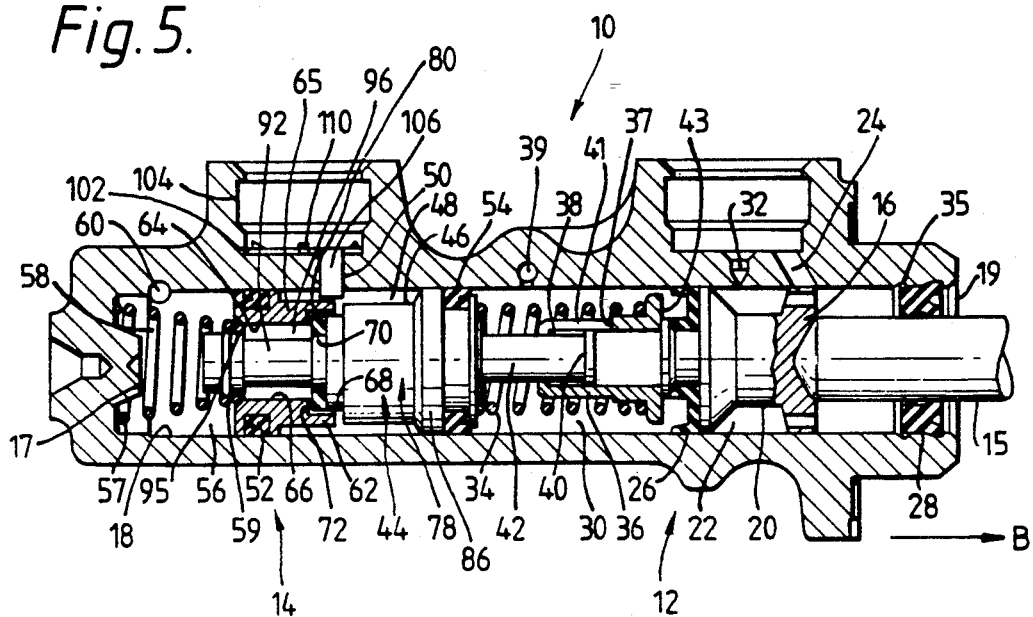
Figure 6:
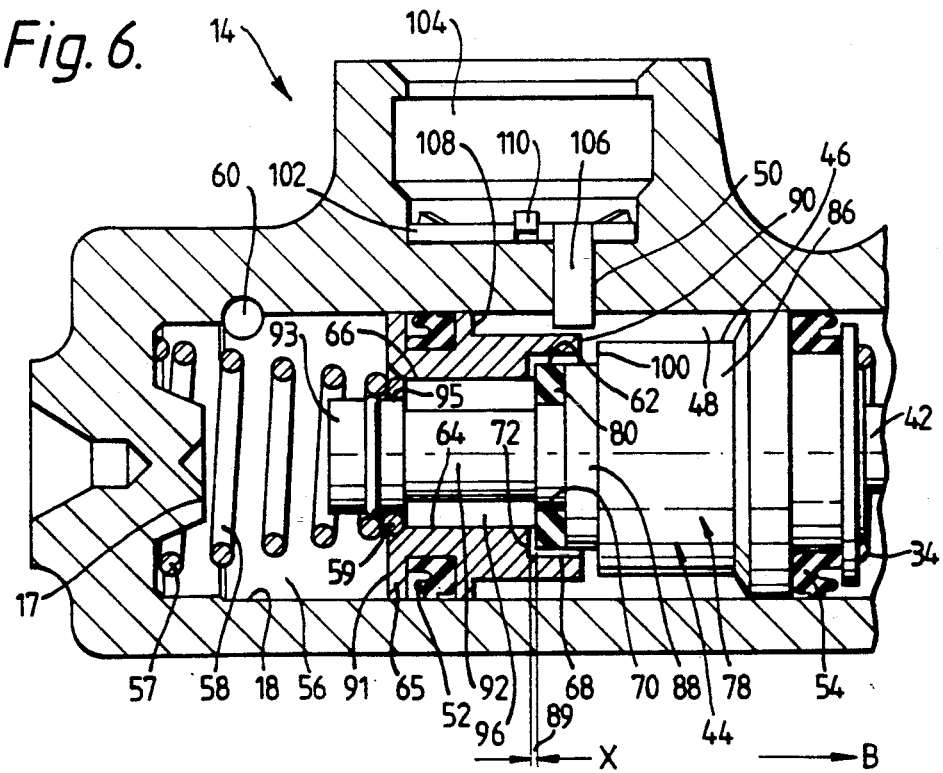
Figure 7:
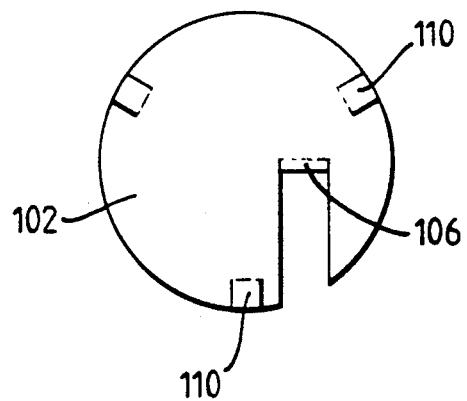
Figure 8:
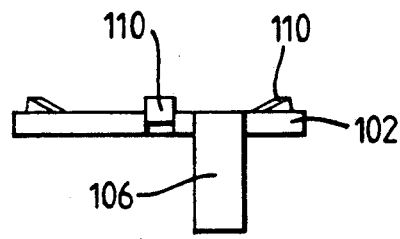

FIGS. 5 and 6 are similar views to that of FIGS. 1 and 2, respectively with the dual master cylinder in the release mode; and FIGS. 7 and 8 are front and side views respectively of the retainer used in the dual master cylinder shown in FIGS. 1 to 6.

Referring to FIG. 1, the dual master cylinder 10 comprises a primary portion 12 and a secondary portion 14. The primary portion 12 is connected to, and is part of, a primary circuit of the braking system of a motor vehicle. Similarly, the secondary portion 14 is connected to, and is part of, the secondary circuit of the braking system.

The primary portion 12 comprises a primary piston 16 axially slidable within a bore 18 having a closed end 17 and an open end 19 in the dual master cylinder 10, and movable by a pushrod 15 actuated by the vehicle operator by pressing on the brake pedal (not shown) of the braking system. The pushrod 15 passes through the open end 19 of the bore 18 to act on the primary piston 16. The primary piston 16 has a reduced diameter portion 20 between its ends to define a low pressure chamber 22 within the bore 18 for the primary portion 12. The primary portion 12 also includes a high pressure chamber 30 within the bore 18. The low pressure chamber 22 is connected to a primary fluid reservoir (not shown) by way of a compensation port 24. An elastomeric cup seal 26 which moves with the primary piston 16 allows hydraulic fluid to flow from the low pressure chamber 22 to the high pressure chamber 30 to compensate for pressure differentials between the low and high pressure chambers 22,30 respectively, on return movement of the primary piston 16 (after application of the brakes), and for brake pad or shoe wear. The elastomeric cup seal 26, however, prevents flow of hydraulic fluid from the high pressure chamber 30 back to the low pressure chamber 22. The high pressure chamber 30 is connected to the primary fluid reservoir by way of a dilation port 32 in a rest mode of the primary piston 16, that is, when the brake pedal is not depressed. The dilation port 32 allows excess hydraulic fluid (generated by thermal expansion, etc.) to flow back to the primary fluid reservoir to ensure there is no residual fluid pressure in the high pressure chamber 30. A ring stop 35 mounted in the bore 18 adjacent the open end 19 retains the primary piston 16 within the bore. An elastomeric cup seal 28 positioned between the ring stop 35 and the open end 19 provides a fluid tight seal between the pushrod 15 and the bore 18 of the dual master cylinder 10. A spring retainer cage 36 is mounted within the high pressure chamber 30. A number of resilient fingers 41 extend away from one end 37 of the spring retainer cage 36, each of which has a lip 38 engageable with a shoulder 40 on an extended portion 42 of a secondary piston 44 (described in more detail below). The lips 38 on the resilient fingers 41 make a snap fit over the shoulder 40 on the extended portion 42 to secure the spring retainer cage 36 to the secondary piston 44, but to allow the spring retainer cage to slide along the extended portion 42. A primary spring 34 is precompressed and positioned between the secondary piston 44 and the spring retainer cage 36. The primary spring 34 biases the other end 43 of the spring retainer cage 36 into engagement with the primary piston 16. This arrangement is such that, in the rest mode, the primary spring 34 holds the primary and secondary pistons 16,44 respectively at a predetermined maximum separation. An outlet port 39 connects the high pressure chamber 30 with the other components (not shown) of the primary circuit of the braking system.

The secondary portion 14 comprises the secondary piston 44, the extended portion 42 of which extends into the high pressure chamber 30 of the primary portion 12. The secondary piston 44 is also slidably mounted in the bore 18 (such that it is axially aligned with the primary piston 16), and has a reduced diameter portion 46 between its ends defining a low pressure chamber 48 within the bore 18 for the secondary portion 14. A compensation port 50 connects the low pressure chamber 48 with a secondary fluid reservoir (not shown). The secondary portion 14 also includes a high pressure chamber 56 within the bore 18. Elastomeric cup seals 52,54 are mounted on the secondary piston 44 to move therewith. One of the elastomeric cup seals 52 allows hydraulic fluid to flow from the low pressure chamber 48 to the high pressure chamber 56, but not in the reverse direction, to compensate for pressure differentials between the low and high pressure chambers 48,56 respectively, on return movement of the secondary piston 44 (after application of the vehicle brakes). Similarly, the other elastomeric cup seal 54 allows hydraulic fluid to flow from the low pressure chamber 48 to the high pressure chamber 30 of the primary portion 12, but not in the reverse direction. A secondary spring 58 is positioned within the high pressure chamber 56 and acts on the secondary piston 44 to bias an assembly of the secondary piston, primary spring 34, spring retainer cage 36, and primary piston 16 towards the open end 19 of the bore 18. The primary piston 16 engages the ring stop 35 in the rest mode to retain the assembly in the bore 18. The primary spring 34 is stronger than (usually of the order of twice as strong) the secondary spring 58 to ensure the whole assembly moves together on initial application of the vehicle brakes, as described below. An outlet port 60 in the high pressure chamber 56 provides a fluid connection with the other components of the secondary circuit.

The dual master cylinder 10 as thus far described is known. When the brake pedal (not shown) is depressed to apply the vehicle brakes, the pushrod 15 acts on the primary piston 16 to move the primary piston, the spring retainer cage 36, and, due to the primary spring 34 being stronger than the secondary spring 58, the secondary piston 44 relative to the bore 18 away from the open end 19 against the action of the secondary spring. Such movement of the secondary piston 44 pressurises the hydraulic fluid in the high pressure chamber 56 to apply the vehicle brakes by way of the secondary circuit. Further, such movement of the primary piston 16 isolates the dilation port 32 from the high pressure chamber 30, and pressurises the hydraulic fluid in the high pressure chamber 30 to apply the vehicle brakes by way of the primary circuit. Release of the brake pedal causes the above movement to be reversed. However, the biasing effect of the secondary spring 58 is such that the secondary and primary pistons 44,16 respectively may move back quicker than the returning hydraulic fluid. To compensate for the 'shortfall' in hydraulic fluid in the high pressure chambers 30,56, hydraulic fluid flows past the elastomeric cup seals 26,52 respectively from the low pressure chambers 22,48 respectively. Similarly, any shortfall of hydraulic fluid in the high pressure chambers 30,56 due to wear of the brake pads or brake shoes can be compensated for in this way. Any build up in fluid pressure in the high pressure chamber 30 (due to thermal expansion etc.) when the dual master cylinder 10 is in the rest mode is dilated to the primary fluid reservoir by way of the dilation port 32.

In accordance with the present invention, the secondary portion 14 also includes a check valve 62 (FIGS. 1 and 2). The check valve 62 is defined by the secondary piston 44 which is split into a central piston 78 and an outer piston 65 having a piston bore 64. The piston bore 64 comprises a small diameter portion 66 which opens into the high pressure chamber 56, and a large diameter portion 68 which opens at one end into the small diameter portion, and which opens at the other end into the low pressure chamber 48. A shoulder 72 connects the small diameter portion 66 with the large diameter portion 68 at said one end of the large diameter portion. The central piston 78 comprises a main body 86 making a sliding fit within the bore 18 and connected with the extended portion 42, an intermediate body 88 within the large diameter portion 68 of the piston bore 64, and a secondary body 92 making a sliding fit within the small diameter portion 66 of the piston bore. The diameter of the intermediate body 88 is less than that of the main body 86, but greater than that of the secondary body 92. The main body 86 and the outer piston 65 have reduced diameter sections which, between them, define the reduced diameter portion 46 of the secondary piston 44. The axial length of the secondary body 92 is greater than the axial length of the small diameter portion 66 of the piston bore 64. The secondary body 92 also has at least one channel 96 extending along its surface. A first abutment face 98 is defined on the central piston 78 where the secondary body 92 meets the intermediate body 88, which is directed towards the shoulder 72 defined by the piston bore 64. An elastomeric ring seal 80 is positioned around the secondary body 92 between the shoulder 72 and the first abutment face 98, and is mounted in a (first) circumferentially extending groove 70 in the secondary body. The check valve 62 thereby comprises the outer piston 65, the elastomeric ring seal 80, and the central piston 78. A second abutment face 100 is defined on the central piston 78 where the intermediate body 88 meets the main body 86. The secondary body 92 has an extended portion 93 projecting into the high pressure chamber 56, the extended portion having a (second) circumferentially extending groove 95 within which one end 59 of the secondary spring 58 is retained. The other end 57 of the secondary spring 58 engages the closed end 17 of the bore 18. The outer piston 65 has one end 90 directed towards and engageable with the second abutment face 100 on the central piston 78, and the other end 91 directed towards and engageable with said one end 59 of the secondary spring 58. A retainer 102 (FIGS. 7 and 8) in the form of a disc is positioned in an input bore 104 for the secondary portion 14, the input bore forming part of the fluid connection between the compensation port 50 and the secondary fluid reservoir (not shown). The retainer 102 has a leg 106 pressed out from the disc which passes through the compensation port 50 and projects into the low pressure chamber 48 to define abutment means engageable by a shoulder 108 (shoulder means) on the outer piston 65. Resilient tangs 110 pressed out from the disc of the retainer 102 hold the retainer in position in the input bore 104. The elastomeric cup seal 52 is mounted on the outer piston 65, and the elastomeric cup seal 54 is mounted on the central piston 78.

In the rest position shown in FIGS. 1 and 2, the central and outer pistons 78,65 respectively (secondary piston 44) are biased away from the closed end 17 of the bore 18 by the secondary spring 58. However, the shoulder 108 on the outer piston 65 engages the leg 106 on the retainer 102 to leave the said other end 93 of the outer piston 65 and the circumferentially extending groove 95 on the extended portion 93 of the secondary body 92 substantially aligned due to the bias of the secondary spring 58. As a consequence, the secondary body 92 projects into the large diameter portion 68 of the piston bore 64, and a gap 89 having a predetermined size X exists between the first abutment face 98 on the central piston 78 and the shoulder 72 defined by the piston bore 64. Hydraulic fluid can therefore flow between the secondary fluid reservoir and the high pressure chamber 56 by way of the input bore 104, the compensation port 50, the low pressure chamber 48, the large diameter portion 68 of the piston bore 64, and the channel(s) 96. Channel(s) 96, and large diameter portion 68 thereby define a fluid passage between the low pressure chamber 48 and the high pressure chamber 56.

When the brake pedal (not shown) is depressed (to apply the vehicle brakes), the pushrod 15 moves in a direction A to move the primary piston 16 in the same direction, that is, away from the open end 19 of the bore 18. Due to this movement, the primary spring 34 acts on the central piston 78, and the central piston 78 also moves in the direction A towards the closed end 17 to compress the secondary spring 58 (FIGS. 3 and 4) due to the said one end 59 of the secondary spring 58 being positioned in the circumferentially extending groove 95. However, due to the resistance of the hydraulic fluid in the high pressure chamber 56, and the frictional effects of the elastomeric cup seal 52, the outer piston 65 does not move relative to the closed end 17 of the bore 18. When the central piston 78 has moved a distance X equal to the gap 89, the elastomeric ring seal 80 engages both the first abutment face 98 on the central piston 78 and the shoulder 72 in the piston bore 64. Further movement of the central piston 78 in the direction A compresses the elastomeric ring seal 80 to form a fluid tight seal between the first abutment face 98 and the shoulder 72, and hence seals the fluid passage 96,68. Still further movement of the central piston 78 towards the closed end 17 pressurises the hydraulic fluid in the high pressure chamber 56 to apply the vehicle brakes by way of the secondary circuit. During this action, the second abutment face 100 on the central piston 78 engages the said one end 90 of the outer piston 65 to prevent overcompression of the elastomeric ring seal 80 (to prevent damaging it), and to move the central piston 78 and the outer piston 65 together. Continued movement of the primary piston 16 in the direction A pressurises the hydraulic fluid in the high pressure chamber 30 to apply the vehicle brakes by way of the primary circuit, and then begins to compress the primary spring 34 until the primary piston engages the extended portion 42 of the main body 86 of the central piston 78.

When the braking effort is released (FIGS. 5 and 6), the pressure of the hydraulic fluid and the bias of the secondary spring 58 act on the outer piston 65 and the central piston 78 to move them back in a direction B (opposite to direction A) to the rest position shown in FIGS. 1 and 2. However, as the secondary spring 58 initially only exerts a biasing (return) force on the central piston 78, the central piston may move in the direction B quicker than the outer piston 65. As a consequence, the gap 89 between the first abutment face 98 and the shoulder 72 begins to reopen until the said one end 59 of the secondary spring 58 engages the said other end 91 of the outer piston 65, at which point the outer piston 65 and the central piston 78 move back together, and the gap 89 returns to its predetermined size X. The outer piston 65 and the central piston 78 then continue to move back until the shoulder 108 on the outer piston 65 engages the leg 106 on the retainer 102, and until the primary piston 16 engages the ring stop 35 to stop further movement of the above described assembly, including the secondary piston 44.

The biasing effect of the secondary spring 58 is such that the secondary piston 44 may move back quicker than the returning hydraulic fluid. The early reopening of the gap 89 allows hydraulic fluid to flow from the low pressure chamber 48 into the high pressure chamber 56 to compensate for this initial shortfall or lack of hydraulic fluid in the high pressure chamber. Further, the gap 89 allows passage of hydraulic fluid from the secondary fluid reservoir into the high pressure chamber 56 to compensate for a shortfall of hydraulic fluid in the high pressure chamber 56 due to wear of the brake pads or brake shoes. This compensating effect enhances the same effects provided by the elastomeric cup seal 52. Further still, the gap 89 allows reverse flow (dilation) of hydraulic fluid should there be an unintentional build up of fluid pressure in the high pressure chamber 56 due to thermal expansion, etc. The gap 89 therefore fulfils the same purpose as the dilation port 32 of the primary portion 12, and no such port is required in the secondary portion 14. Where the braking system includes ABS, when ABS operates a flow of hydraulic fluid is sent back to the high pressure chamber 56 increasing the fluid pressure therein. As no dilation port is present in the secondary portion 14, no damage can occur to the elastomeric cup seal 52. The secondary spring end 59 has a larger diameter than the small diameter portion 66.

By retaining the said one end 59 of the secondary spring 58 in the circumferentially extending groove 95, excessive return movement of the central piston 78 is substantially prevented should the primary spring 34 fail. This arrangement reduces the risk of the elastomeric cup seal 54 on the central piston 78 reaching, and being damaged by, the outlet port 39 of the high pressure chamber 30.

As well as overcoming the problems associated with prior known dual master cylinders, the present invention has the additional advantage that all of the components within the bore 18 of the dual master cylinder 10 can be assembled as a complete sub-assembly prior to insertion in the bore, and can be inserted in any orientation as there is no requirement to align the sub-assembly with a component inserted through the housing of the dual master cylinder (which also means there is no possibility of fluid leakage around this component). The only component inserted through the housing is the leg 106 of the retainer 102. By providing a circumferentially extending shoulder 108 on the outer piston 65, the orientation of the outer piston is immaterial. Further, as the leg 106 projects through the compensation port 50, there is no possibility of fluid leakage to the outside of the housing. Further still, the check valve arrangement can be incorporated into the dual master cylinder without any increase in its length, and the arrangement is very simple.

As an alternative to the above arrangement, the retainer could be in the form of a cylindrical (hollow) pin which is positioned in the compensation port 50, and which has a stop shoulder on its input bore end to prevent over-insertion, and which projects into the low pressure chamber 48 to define abutment means engageable by the shoulder 108 on the outer piston 65.

Whilst the present invention has been described in regard to a dual master cylinder having a check valve in the secondary portion only, a check valve may also be positioned in the primary portion 12 to replace the dilation port 32. The check valve may be a suitably modified version of the above described check valve or of the check valve described in our other patent application no. (Ref: MJD/467), filed the same day as the present application. Preferably, however, the check valve used in the primary portion is as described in our patent application no. (Ref: MJD/468), also filed the same day as the present application.

I claim:

1. A dual master cylinder for the braking system of a motor vehicle comprising a bore having an open end and a closed end;
   a primary portion including a primary piston slidable in the bore, a low pressure chamber within the bore and defined by the shape of the primary piston, and a compensation port opening into the low pressure chamber and connectable with a primary fluid reservoir;
   and a secondary portion including a secondary piston slidable in the bore, a low pressure chamber within the bore and defined by the shape of the secondary piston, and a compensation port opening into the low pressure chamber and connectable with a secondary fluid reservoir;
   a primary spring between the primary and secondary pistons;
   the primary portion including a high pressure chamber within the bore between the primary piston and the secondary piston, and the secondary portion including a high pressure chamber within the bore between the secondary piston and the closed end of the bore;
   a seal being mounted on the primary piston between the low and high pressure chambers of the primary portion;
   a seal being mounted on the secondary piston between the low and high pressure chambers of the secondary piston;
   the high pressure chamber of the primary portion being fluidly connectable with the primary fluid reservoir by dilation means;
   the secondary piston comprising an outer piston slidable in the bore and having the secondary piston seal mounted thereon, and a central piston, the central piston including a main body slidable in the bore and a secondary body slidable in a piston bore in the outer piston, the piston bore having a shoulder engageable with a first abutment face on the central piston during the actuation of the master cylinder to define a check valve, the piston bore providing a fluid passage between the high pressure chamber and the low pressure chamber of the secondary portion, the check valve allowing hydraulic fluid to flow through the fluid passage during a rest mode or a release mode of the dual master cylinder, but preventing such flow during an apply mode, wherein the piston bore comprises a small diameter portion which opens into the high pressure chamber of the secondary portion and a large diameter portion, the shoulder being positioned between the large diameter portion and the small diameter portion;
   wherein the large diameter portion opens into the low pressure chamber of the secondary piston;
   wherein the central piston comprises an intermediate body between the main body and the secondary body and positioned within the large diameter portion of the piston bore;
   and wherein the secondary body is sildably positioned in the small diameter portion of the piston bore, the first abutment face being positioned between the intermediate body and the secondary body, the secondary body having a channel in its surface;
   the fluid passage being defined by the channel, and the large diameter portion; and a secondary spring in the high pressure chamber of the secondary portion contacting the closed end of the bore and the secondary body of the central piston to bias the first abutment face away from the shoulder of the bore of the central piston and wherein the axial length of the secondary body is greater than the axial length of the small diameter portion of the piston bore by a predetermined amount to define the maximum separation of the first abutment face and shoulder and wherein an abutment means projects into the low pressure chamber of the secondary portion which is engageable by shoulder means on the outer piston to ensure opening of the fluid passage in the rest mode and wherein the secondary spring has a larger diameter than the outer piston bore small diameter portion and the end of the secondary spring contacting the secondary body of the central piston is prevented from moving excessively in a return direction by the outer piston upon failure of the primary spring.

2. A dual master cylinder as claimed in claim 1, wherein an elastomeric ring seal is positioned between the first abutment face and the shoulder.

3. A dual master cylinder as claimed in claim 2, wherein the central piston has a second abutment face engageable with one end of the outer piston to prevent overcompression of the elastomeric ring seal.

4. A dual master cylinder as claimed in claim 1, in which an elastomeric ring seal is positioned between the first abutment face and the shoulder; wherein the elastomeric ring seal is mounted in a first circumferentially extending groove in the secondary body.

5. A dual master cylinder as claimed in claim 1, wherein the seal on the primary piston is an elastomeric cup seal.

6. A dual master cylinder as claimed in claim 11, wherein the dilation means in the primary portion is a dilation port.

7. A dual master cylinder as claimed in claim 1, wherein the abutment means is a leg pressed out from a disc and positioned to project through the compensation port of the secondary portion.

8. A dual master cylinder as claimed in claim 1, wherein the dilation means in the primary portion is a check valve means.

9. A dual master cylinder as claimed in claim 1, wherein one end of the secondary spring is retained in a second circumferentially extending groove in the secondary body.

10. A dual master cylinder as claimed in claim 1, wherein the seal on the secondary piston is an elastomeric cup seal.

* * * * *